Patented Dec. 8, 1953

2,662,068

UNITED STATES PATENT OFFICE 2,662,068

ORGANIC SOLVENT GELS

Don E. Floyd, Robbinsdale, Minn., assignor to General Mills, Inc., a corporation of Delaware No Drawing. Application March 16, 1951,
Serial No. 216,090

15 Claims. (Cl. 260—33.6)

The present invention relates to the formation of gels by the addition of a polyamide gelling agent to organic solvents. The gels prepared from gasoline and related hydrocarbons and hydrocarbon mixtures are useful for incendiary bombs and flame throwers and may also be used for the transfer of fluid materials. The gels prepared from heavy oils such as lubricating oils are useful as lubricating greases.

It is well known that many fatty acid soaps, for example, the aluminum, calcium and lithium soaps, can be used to gel hydrocarbons. The name "napalm" has been applied to a gasoline gelling agent made up of the aluminum soap of a carboxylic acid mixture. From 5% to 10% or more of the "napalm" is needed to make a satisfactory gasoline gel. Likewise about 5% to 10% or more of a soap is required to gel a lubricating oil to make a satisfactory lubricating grease.

It has now been discovered that firm gels can be obtained from gasoline, lubricating oils, and many organic solvents by the addition of as little as 1% to 2% of the polyamide gelling agent. Containers holding these gels can be inverted without loss of material and without liquid flow. In addition the gels prepared from the polyamide gelling agent differ from those prepared with soaps in the following respects. The gels of the present invention are partially broken by vigorous agitation, whereas the soap gels are not. It is thus possible partially to restore the original liquid state of the organic solvent from the gel by agitation and thus it is possible to recover the original liquid at least partially without removing the gelling agent. Likewise the present gels do not form strings or filaments when a rod is dipped or stirred in the mixture. Instead they form curds and pastes when treated in this manner. The present gels have many of the suitable properties of water-gelatin gels.

It is therefore an object of the present invention to provide novel organic solvent gels employing a novel polyamide gelling agent.

It is another object of the present invention to provide a novel process of producing such gels.

The polyamide gelling agents employed in the present invention are the polyamides disclosed in my U. S. Patent No. 2,461,495. These are resinous polyamides having a unit length of at least 8, in which the diacyl group has the formula

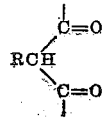

in which R is an aliphatic hydrocarbon substituent containing from 6 to 16 carbon atoms, and containing a polyamino group of the formula

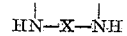

in which X is a divalent organic radical which separates the amino groups by a chain of at least 3 atoms in length, the chain being selected from the group consisting of carbon chains and carbon chains interrupted solely by nitrogen. The malonic acids employed in the preparation of the polyamide can contain an aliphatic hydrocarbon substituent ranging in length from 6 to 16 carbon atoms. These substituted malonic acids may be made in accordance with the teachings of my Patent No. 2,523,692, in which case the aliphatic hydrocarbon substituent will correspond to the aliphatic hydrocarbon substituent of the fatty acid from which it is derived but will be 2 carbon atoms shorter. The fatty acids employed in the preparation of the substituted malonic acids include any single acid from a fat or oil or any selected group of such acids or the mixed acids of a fat or oil. Best results are obtained with malonic acids having 16 carbon atom aliphatic hydrocarbon substituents, and accordingly these are preferred. Moreover, it is preferred to have saturated aliphatic hydrocarbon substituents instead of unsaturated hydrocarbon substituents, since there is some tendency of the unsaturated substituents to cross-link on aging and heating and thus to possess more limited solubility. Accordingly the $C_{16}$ saturated substituents are preferred.

The polyamines used for the preparation of the polyamides must have 3 or more carbon atoms or hetero atoms separating the amine groups. Typical polyamines include 1,3 - diaminopropane, 1,3-diaminopropanol, hexamethylene diamine, diethylene triamine, polyethylene polyamines, propylene diamine, polypropylene polyamines, and the like. Of these the ones having the shorter chain separating the amino groups have stronger gelation tendencies, and accordingly are preferred. In general the polyamides prepared from these materials have molecular weights within the approximate range of 2,000 to 2,500 and this range of molecular weights is preferred. However considerable variation outside this range is possible while still obtaining satisfactory solubility and gelation characteristics. As the molecular weight is increased, the solubility is decreased, and as the molecular weight is decreased, the solubility increases to the point where it is difficult to produce gels at low concentrations.

Generally, solubility at the level of 1-5% is ordinarily preferred for good gelation characteristics. In most instances from 1-2% of the polyamide gelling agent is sufficient.

The present polyamide gelling agents are useful in the gelation of any organic solvent material containing an aromatic or aliphatic hydrocarbon substituent of at least 6 carbon atoms. The invention is particularly adapted to the gelation of gasolines, various mineral oils, mineral spirits, and lubricating oils. The invention is also applicable to other materials than simple hydrocarbons, such as alcohols and ketones containing a hydrocarbon substituent of at least 6 carbon atoms. Thus octyl alcohol, cyclohexanol, benzyl alcohol, and acetophenone have been found to be useful in the preparation of these polyamide gels.

The following examples will serve to illustrate the invention:

Example 1

A polyamide was prepared from 1 mol of cetylmalonic ester and 1 mol of 1,3-diaminopropane. The reaction was conducted by gradually heating these reagents to 200° C. in an atmosphere of nitrogen during a period of 1½ hours, holding this temperature for about 1½ hours more, and then applying vacuum for 1½ hours. The vacuum was released with nitrogen and the molten product (at about 170° C.) was poured over Dry Ice. It solidified at once to a hard, waxy material. The ball and ring melting point of this product was 165° C. The molecular weight was estimated by titration of residual amine groups to be in the range of 2400.

Gels were prepared from this polyamide with a variety of hydrocarbon and other organic solvent materials. In each instance the quantity of polyamide indicated in the following table was mixed with the solvent material indicated and the mixture heated to its boiling point to dissolve the polyamide. The mixture was then allowed to cool to room temperature and in each instance gelation occurred.

| Solvent | Percent polyamide by weight |
| --- | --- |
| Petroleum ether (Skellysolve B) | 1 |
| Mineral spirits (heated on steam bath) | 1 |
| Mineral Oil (Nujol) (heated on steam bath) | 1 |
| n-Octyl alcohol | 3 |
| Cyclohexane | 1 |
| Toluene | 1 |
| Cyclohexanol | 2 |
| Benzyl alcohol | 1 |
| Acetophenone | 1 |

Example 2

A polyamide was prepared from cetylmalonic ester (1 mol) and hexamethylene diamine (1 mol) as described in the previous example. In this experiment the heating period was extended so that the reaction mixture was heated to 200° C. during a 2 hour period, held at that temperature for 2 hours, and then heated under reduced pressure for 3 more hours.

The hard, waxy product had a melting point (ball and ring) of 122° C. The molecular weight was estimated by titration of residual amine groups to be in the range of 2000-2100.

Mineral spirits and mineral oil were mixed with 2% by weight of this polyamide and the mixture heated to dissolve the polyamide. The solution was then cooled to room temperature and gelation occurred in each instance.

Example 3

A polyamide was prepared from cetylmalonic ester and 1,3-diaminopropane as described in Example 1, and the product tested for solubility and gelation tendency in 100-octane gasoline. The polyamide was pulverized in a mortar and the powder was stirred with boiling gasoline. A reflux condenser was used to prevent loss of solvent. It was found that about 5% of polyamide was the maximum that could be dissolved in the gasoline by this method. A number of solutions were prepared at various polyamide concentrations and these solutions were cooled to room temperature and the gelation tendencies noted. These are as follows:

| Polyamide, percent by weight | Gelation tendency | Gel properties |
| --- | --- | --- |
| 1 | Firm gel | Partially broken when agitated. |
| 2 | do | Do. |
| 3 | do | Slightly broken when agitated. |
| 5 | do | Little change on agitation. |

Portions of the gelled gasoline containing 2% and 5% of the polyamide, were thrown against the side of a glass plate which was held vertically. There was very little spattering and the gels adhered firmly to the plate without flowing. They were highly flammable and became more fluid when ignited so that some burning gasoline ran down the plate.

These gels, as well as the other gels referred to previously, can be partially broken on vigorous agitation, depending on the concentration of the polyamide. In each instance, however, the firm gel condition can be completely restored simply by heating the broken gel until solution is again effected, after which the solution is cooled to produce the gel.

Example 4

A polyamide was prepared from cetylmalonic ester and 1,3-diaminopropane as described in Example 2, and the product was tested for gelation tendency in SAE 40 lubricating oil. A solution containing 2% by weight of this polyamide was prepared by stirring the pulverized solid polyamide with the oil while warm (50-60° C.). A firm gel was obtained when the solution was cooled to room temperature. This gel was slightly broken on vigorous agitation and could be reformed by warming to effect solution, followed by cooling. The gel resembled a lubricating grease in appearance, but was firm rather than stringy.

Similar gels were obtained with the polyamide products disclosed in Example 1 with this and other lubricating oils.

Example 5

A polyamide resin was prepared from cetylmalonic ester and 1,3-diaminopropane as described in Example 1, and a firm gel was prepared from this polyamide by dissolving 5% by weight of this polyamide in mixed soybean oil fatty acids. The polyamide dissolved readily and a firm gel was obtained when the mixture was cooled to room temperature. Ten grams of this gel was stirred with an equal portion of 100-octane gasoline and the mixture warmed. The mixture became clear and homogeneous quickly, and upon cooling to room temperature a gel was formed.

Similar results were obtained with 5% of this polyamide formed in a gel in SAE 40 lubricating oil and an equal quantity of this gel mixed with 100-octane gasoline. Both of these gels were highly flammable.

It will thus be seen that the present invention is applicable to a wide variety of solvents, particularly those having long hydrocarbon chains. These solvents dissolve the polyamides readily and form gels readily. Aliphatic, alicyclic, and aromatic hydrocarbons are especially suitable, as are compounds which contain aliphatic, alicyclic, and aromatic hydrocarbon groups containing at least 6 carbon atoms. Thus in addition to the hydrocarbons themselves, long chain alcohols, glyceride oils, monohydride alcohol esters of fatty acids, and fatty acids themselves, may be employed.

The polyamide must be soluble to the extent of at least ½% by weight in the hot solvent before gelation can occur. The range of 1% to 5% seems to be most suitable for gel formation but higher concentrations limited only by the solubility of the polyamide in the solvent can be employed if desired. The gels formed at the higher concentrations are extremely stiff.

I claim as my invention:

1. An organic solvent gel containing an organic solvent having a hydrocarbon group containing at least 6 carbon atoms, and containing from ½–5% of a resinous polyamide gelling agent, said polyamide containing a diacyl group of the formula

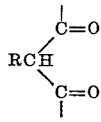

in which R is an aliphatic hydrocarbon substituent containing from 6 to 16 carbon atoms, and containing a polyamino group of the formula

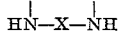

in which X is a divalent organic radical which separates the amino groups by a chain of at least 3 atoms in length, said chain being selected from the group consisting of carbon chains and carbon chains interrupted solely by nitrogen.

2. An organic solvent gel according to claim 1 in which the polyamide is present in the range of from 1% to 5% by weight of the organic solvent.

3. An organic solvent gel according to claim 1 in which the organic solvent is a hydrocarbon.

4. An organic solvent gel according to claim 1 in which the organic solvent is mineral oil.

5. An organic solvent gel according to claim 1 in which the organic solvent is lubricating oil.

6. An organic solvent gel according to claim 1 in which the organic solvent is gasoline.

7. An organic solvent gel according to claim 1 in which the polyamide has a molecular weight within the approximate range of 2000 to 2500.

8. An organic solvent gel comprising an organic solvent having a hydrocarbon group containing at least 6 carbon atoms and from ½–5% of a polyamide gelling agent, the polyamide being a resinous polyamide having a unit length of at least 8, in which the diacyl group has the formula

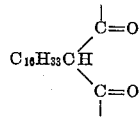

and containing the diamino group

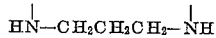

9. An organic solvent gel comprising an organic solvent having a hydrocarbon group containing at least 6 carbon atoms and from ½–5% of a polyamide gelling agent, the polyamide being a resinous polyamide having a unit length of at least 8, in which the diacyl group has the formula

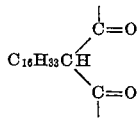

and containing the polyamino group

10. An organic solvent gel according to claim 8 in which the polyamide is present in the range of from 1% to 5% by weight of the organic solvent.

11. An organic solvent gel according to claim 8 in which the organic solvent is a hydrocarbon.

12. An organic solvent gel according to claim 8 in which the organic solvent is mineral oil.

13. An organic solvent gel according to claim 8 in which the organic solvent is lubricating oil.

14. An organic solvent gel according to claim 8 in which the organic solvent is gasoline.

15. An organic solvent gel according to claim 8 in which the polyamide has a molecular weight within the approximate range of 2000 to 2500.

DON E. FLOYD.

References Cited in the file of this patent

UNITED STATES PATENTS

| Number | Name | Date |
|---|---|---|
| 2,443,378 | Dittmar | June 15, 1948 |
| 2,445,311 | Cooke et al. | July 20, 1948 |
| 2,445,312 | Cooke et al. | July 20, 1948 |
| 2,461,495 | Floyd | Feb. 8, 1949 |